(12) United States Patent
Tsuji

(10) Patent No.: US 10,037,226 B2
(45) Date of Patent: Jul. 31, 2018

(54) ELECTRONIC DEVICE WITH PLURALITY OF PROCESSES EXECUTING PROCESSINGS CORRESPONDING TO INTERRUPTS, INTERRUPT PROCESSING METHOD, AND RECORDING

(71) Applicant: KYOCERA Document Solutions Inc., Osaka (JP)

(72) Inventor: Shuntaro Tsuji, Osaka (JP)

(73) Assignee: KYOCERA Document Solutions, Inc., Osaka (JP)

( * ) Notice: Subject to any disclaimer, the term of this patent is extended or adjusted under 35 U.S.C. 154(b) by 173 days.

(21) Appl. No.: 15/205,801

(22) Filed: Jul. 8, 2016

(65) Prior Publication Data

US 2017/0060625 A1    Mar. 2, 2017

(51) Int. Cl.
G06F 9/46       (2006.01)
G06F 9/48       (2006.01)

(52) U.S. Cl.
CPC .................. G06F 9/4812 (2013.01)

(58) Field of Classification Search
CPC ......... G06F 13/24; G06F 9/4812; G06F 9/485
See application file for complete search history.

(56) References Cited

U.S. PATENT DOCUMENTS

| | | | | |
|---|---|---|---|---|
| 5,864,701 A * | 1/1999 | Col | ........................ | G06F 13/24 710/260 |
| 7,320,044 B1 * | 1/2008 | Zandonadi | ............ | G06F 9/4812 710/261 |
| 7,664,903 B2 * | 2/2010 | Bělonožnik | ........... | G06F 13/385 710/300 |
| 2006/0117316 A1 * | 6/2006 | Cismas | ................. | G06F 9/3851 718/103 |
| 2007/0028240 A1 * | 2/2007 | Hayakawa | .......... | G06F 11/3636 718/100 |
| 2009/0222250 A1 * | 9/2009 | Ito | ....................... | G06F 17/5022 703/14 |
| 2010/0162265 A1 * | 6/2010 | Heddes | .................... | G06F 9/542 719/314 |
| 2011/0173640 A1 * | 7/2011 | Kreuzenstein | .......... | G06F 13/24 719/328 |
| 2011/0219208 A1 * | 9/2011 | Asaad | ..................... | G06F 15/76 712/12 |

FOREIGN PATENT DOCUMENTS

JP          10-31596         2/1998

* cited by examiner

*Primary Examiner* — Dong Kim
(74) *Attorney, Agent, or Firm* — Stein IP, LLC

(57) ABSTRACT

An electronic device includes a plurality of processes, an interrupt waiting unit for each of the processes, and an interrupt handler. The interrupt handler processes the interrupt. The interrupt waiting unit sets an interrupt waiting flag to wait for an occurrence of the interrupt. The interrupt handler, when the interrupt occurred, sets an interrupt style of the occurred interrupt and releases the interrupt waiting flag from the set state. The interrupt waiting unit, when the interrupt waiting flag was released from the set state, sets the interrupt waiting flag if the interrupt style set by the interrupt handler is not an interrupt style matched with the process, and operates the process if the interrupt style set by the interrupt hander is the interrupt style matched with the one of the processes. The interrupt waiting flag is located to each of the processes.

5 Claims, 10 Drawing Sheets

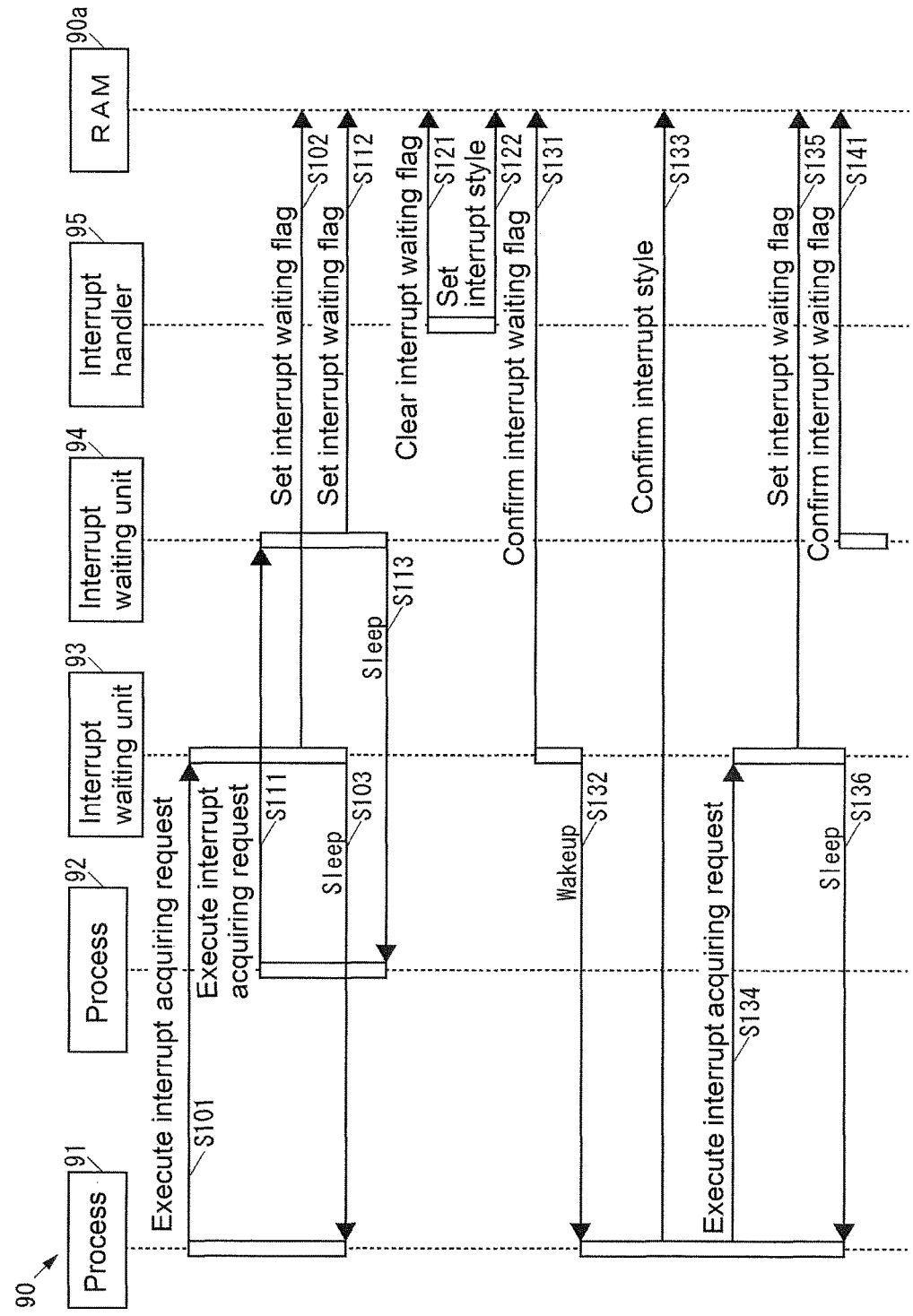

ELECTRONIC DEVICE WITH PLURALITY OF PROCESSES EXECUTING PROCESSINGS CORRESPONDING TO INTERRUPTS, INTERRUPT PROCESSING METHOD, AND RECORDING

INCORPORATION BY REFERENCE

This application is based upon, and claims the benefit of priority from, corresponding Japanese Patent Application No. 2015-167758 filed in the Japan Patent Office on Aug. 27, 2015, the entire contents of which are incorporated herein by reference.

BACKGROUND

Unless otherwise indicated herein, the description in this section is not prior art to the claims in this application and is not admitted to be prior art by inclusion in this section.

In a typical electronic device, an interrupt occurs to each of a plurality of processes.

SUMMARY

An electronic device according to an aspect of the disclosure includes a plurality of processes, a plurality of interrupt waiting units, and an interrupt handler. The plurality of interrupt waiting units correspond to the plurality of processes, respectively. The interrupt handler processes interrupts of the plurality of processes. The plurality of interrupt waiting unit sets an interrupt waiting flag to wait for an occurrence of the interrupt and wait for a process corresponding to each of the plurality of interrupt waiting units. The interrupt handler, when the interrupt occurred, sets an interrupt style of the occurred interrupt and clears the set interrupt waiting flag. the plurality of interrupt waiting units include a first interrupt waiting unit that corresponds to a first process associated with the set interrupt style and a second interrupt waiting unit that corresponds to a second process not associated with the set interrupt style. the first interrupt waiting unit operates the first process when the interrupt waiting flag was cleared. The second interrupt waiting unit set the interrupt waiting flag when the interrupt waiting flag was cleared. The interrupt waiting flag is located to each of the plurality of processes.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 10 is an exemplary operation of the electronic device according to the comparative example when executing the interrupt processing, and is different from the exemplary operation illustrated in FIG. 9.

DETAILED DESCRIPTION

Figure 1:
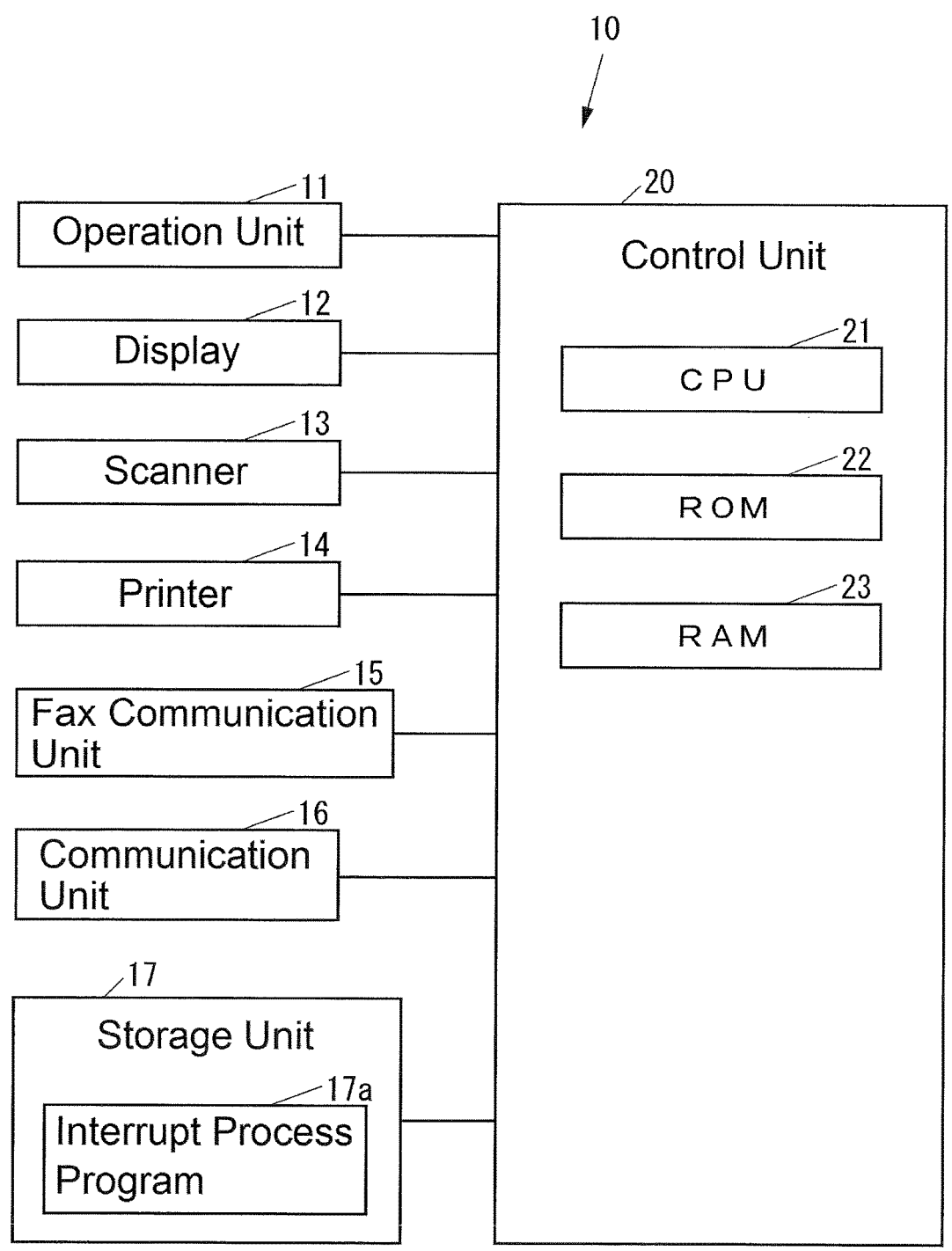
FIG. 1 illustrates an MFP according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereinafter, a comparative example will be described by referring to the drawings before describing an embodiment of the disclosure.

Figure 6:
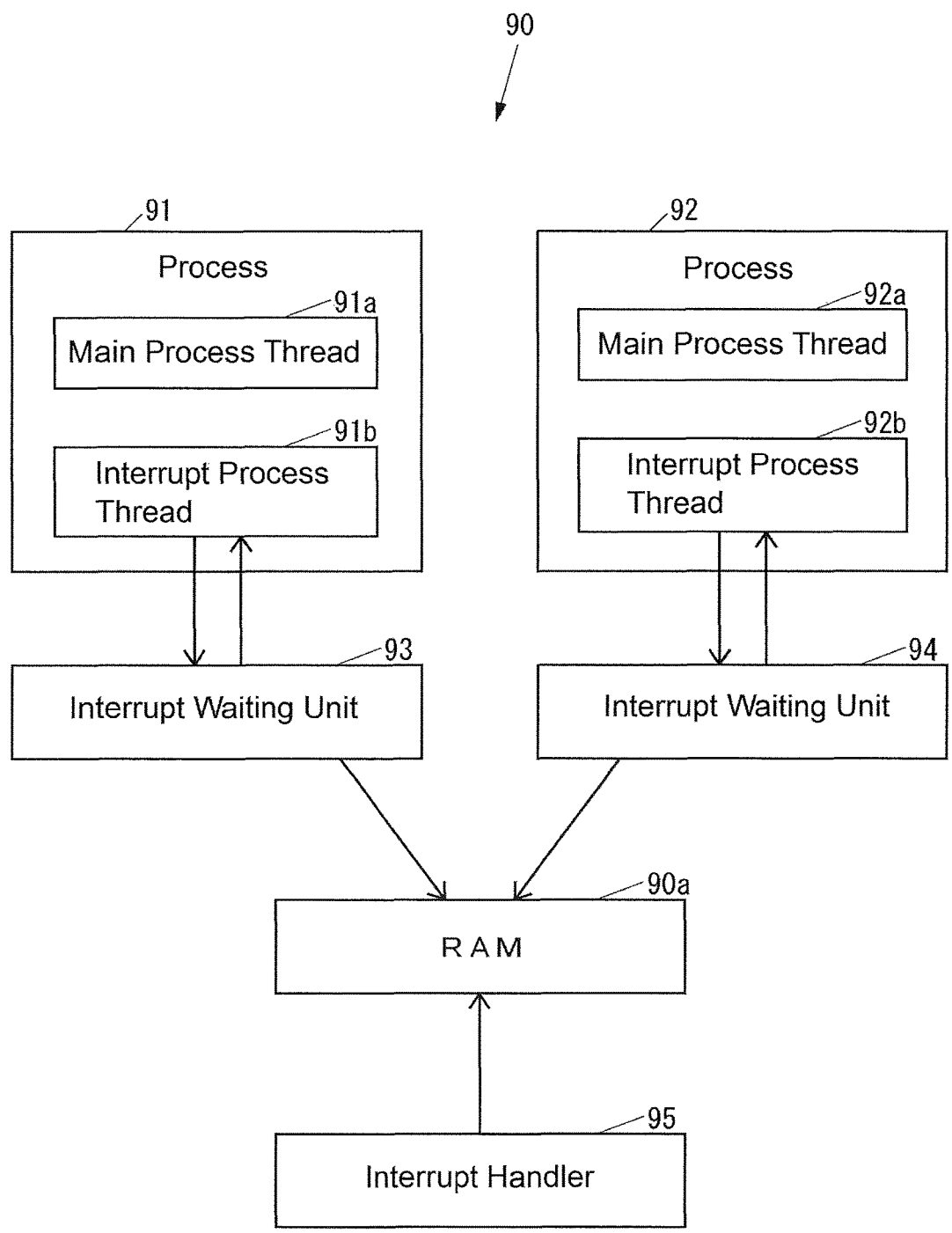
FIG. 6 illustrates a function of an electronic device according to a comparative example where both of the two processes do not wait for occurrences of interrupts.

FIG. 6 is a block diagram illustrating a function of an electronic device 90 according to the comparative example where both of a process 91 and a process 92 are not waiting for occurrences of the interrupts.

The electronic device 90 in FIG. 6 uses Linux (registered trademark) system calls as an event waiting mechanism.

The electronic device 90 can execute the process 91, the process 92, an interrupt waiting unit 93, which waits for the interrupt to the process 91 as a Linux interrupt waiting function, an interrupt waiting unit 94, which waits for the interrupt to the process 92 as a Linux interrupt waiting function, and an interrupt handler 95 as a task for processing the interrupts.

The process 91 includes a main process thread 91a, which executes a main processing of the process 91, and an interrupt process thread 91b, which processes the interrupt.

The process 92 includes a main process thread 92a, which executes a main processing of the process 92, and an interrupt process thread 92b, which processes the interrupt.

Figure 7:
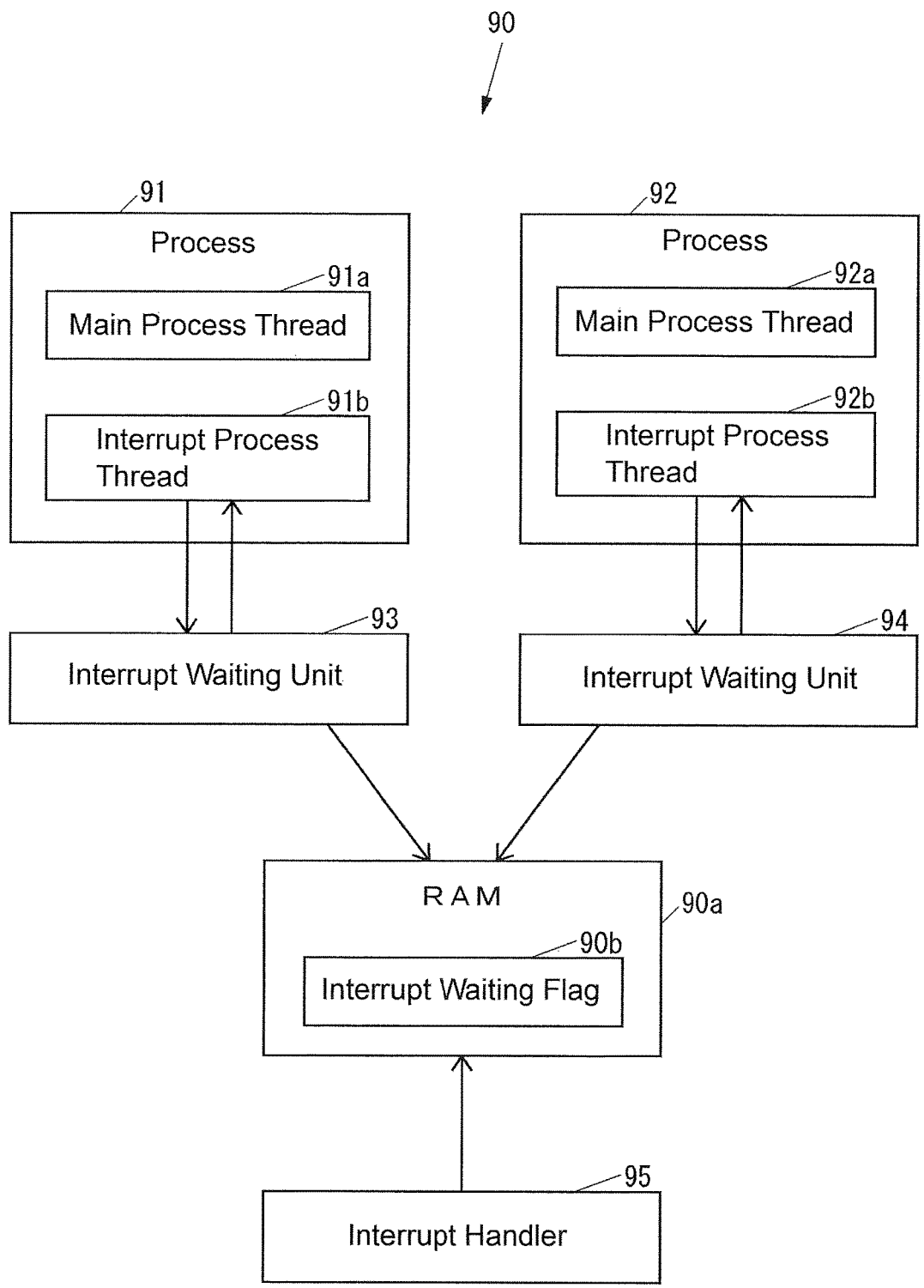
FIG. 7 is a block diagram illustrating a function of the electronic device according to the comparative example where at least one of the two processes waits for the occurrence of the interrupt.

FIG. 7 is a block diagram illustrating a function of the electronic device 90 according to the comparative example where at least one of the process 91 and the process 92 waits for the occurrence of the interrupt.

When the main process thread 91a waits for the occurrence of the interrupt, the interrupt process thread 91b of the process 91 executes an interrupt acquiring request on the interrupt waiting unit 93. Accordingly, as illustrated in FIG. 7, the interrupt waiting unit 93 sets an interrupt waiting flag 90b in a specified address on a RAM 90a of the electronic device 90 to wait for the occurrence of the interrupt, and retains the process 91 in a wait state by putting the process 91 to sleep.

Similarly, when the main process thread 92a waits for the occurrence of the interrupt, the interrupt process thread 92b of the process 92 executes an interrupt acquiring request on the interrupt waiting unit 94. Accordingly, as illustrated in FIG. 7, the interrupt waiting unit 94 sets the interrupt waiting flag 90b in a specific address on the RAM 90a and retains the process 92 in the wait state by putting the process 92 to sleep.

When setting the interrupt waiting flag 90b, if the interrupt waiting flag 90b has already been set, the interrupt waiting unit 93 and the interrupt waiting unit 94 set the interrupt waiting flag 90b again.

Figure 8:
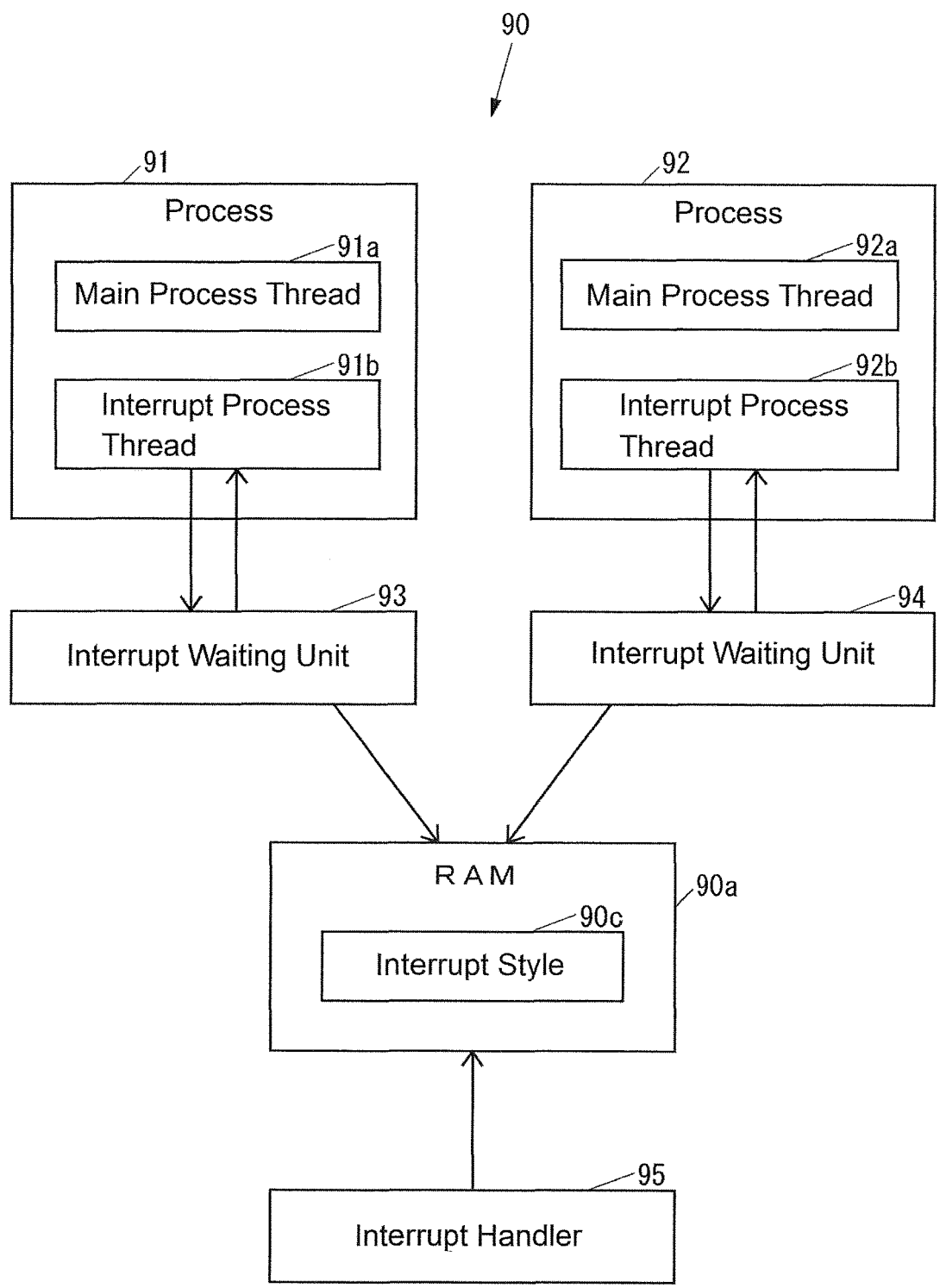
FIG. 8 illustrates a function of the electronic device according to the comparative example where the interrupt has occurred.

FIG. 8 is a block diagram illustrating a function of the electronic device 90 according to the comparative example in an interrupt occurring state.

When any interrupt such as a press of a power button, a press of a power saving key for power saving, or reception of an instruction from a network occurs, the interrupt handler 95 clears the interrupt waiting flag 90b on the RAM 90a. That is, the interrupt handler 95 releases the interrupt waiting flag 90b from the set state.

Then, the interrupt handler 95, as illustrated in FIG. 8, sets an interrupt style 90c for the occurred interrupt in a specific address on the RAM 90a.

Upon detecting a change in the interrupt waiting flag 90b from the set state as illustrated in FIG. 7 to a cleared state as illustrated in FIG. 8, the interrupt waiting unit 93 releases the process 91 from the wait state by causing the process 91 to wake up or get up.

Similarly, upon detecting a change in the interrupt waiting flag 90b from the set state as illustrated in FIG. 7 to the cleared state as illustrated in FIG. 8, the interrupt waiting unit 94 releases the process 92 from the wait state by causing the process 92 to wake up or get up.

Upon released from the wait state, the interrupt process thread 91b of the process 91 confirms the interrupt style 90c on the RAM 90a to determine whether or not the interrupt style 90c is matched with the process 91. Then, if the interrupt process thread 91b determines that the interrupt style 90c is matched with the process 91, the main process thread 91a is operated. On the other hand, if the interrupt process thread 91b determines that the interrupt style 90c is not matched with the process 91, the interrupt acquiring request is executed on the interrupt waiting unit 93. Accordingly, the interrupt waiting unit 93, as illustrated in FIG. 7, sets the interrupt waiting flag 90b in the specific address on the RAM 90a of the electronic device 90 to wait for the occurrence of the interrupt, and retains the process 91 in the wait state by putting the process 91 to sleep.

Similarly, upon released from the wait state, the interrupt process thread 92b of the process 92 confirms the interrupt style 90c on the RAM 90a to determine whether or not the interrupt style 90c is matched with the process 92. Then, if the interrupt process thread 92b determines that the interrupt style 90c is matched with the process 92, the main process thread 92a is operated. On the other hand, if the interrupt process thread 92b determines that the interrupt style 90c is not matched with the process 92, the interrupt acquiring request is executed on the interrupt waiting unit 94. Accordingly, the interrupt waiting unit 94, as illustrated in FIG. 7, sets the interrupt waiting flag 90b in the specific address on the RAM 90a of the electronic device 90 to wait for the occurrence of the interrupt, and retains the process 92 in the wait state by putting the process 92 to sleep.

When setting the interrupt waiting flag 90b, if the interrupt waiting flag 90b has already been set, the interrupt waiting unit 93 and the interrupt waiting unit 94 set the interrupt waiting flag 90b again.

Figure 9:
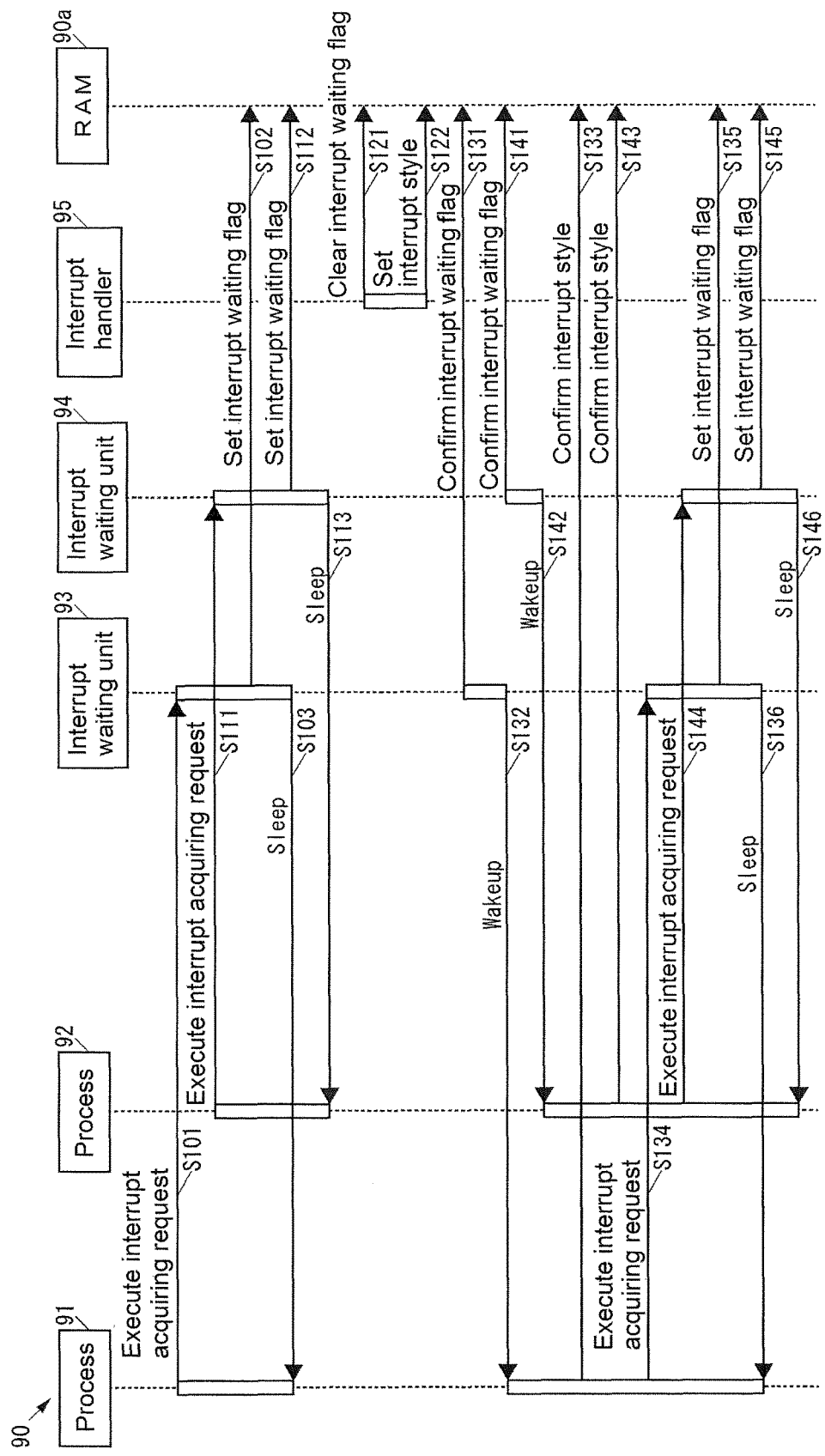
FIG. 9 illustrates an exemplary operation of the electronic device according to the comparative example when executing an interrupt processing.

FIG. 9 is a sequence diagram illustrating an exemplary operation of the electronic device 90 according to the comparative example when executing an interrupt processing.

According to the operation illustrated in FIG. 9, the interrupt process thread 91b of the process 91 executes the interrupt acquiring request on the interrupt waiting unit 93 (Step S101), and the interrupt waiting unit 93 sets the interrupt waiting flag 90b (Step S102) to put the process 91 to sleep (Step S103). Similarly, the interrupt process thread 92b of the process 92 executes the interrupt acquiring request on the interrupt waiting unit 94 (Step S111), and the interrupt waiting unit 94 sets the interrupt waiting flag 90b (Step S112) to put the process 92 to sleep (Step S113).

Then, the interrupt handler 95, when any interrupt has occurred, clears the interrupt waiting flag 90b (Step S121), and sets the interrupt style 90c for the occurred interrupt (Step S122).

Accordingly, the interrupt waiting unit 93 confirms that the interrupt waiting flag 90b has been cleared (Step S131) and causes the process 91 to wake up (Step S132). Then, the interrupt process thread 91b of the process 91, upon determining that the interrupt style 90c is not matched with the process 91 (Step S133), executes the interrupt acquiring request on the interrupt waiting unit 93 (Step S134). Consequently, the interrupt waiting unit 93 sets the interrupt waiting flag 90b (Step S135) to put the process 91 to sleep (Step S136).

Similarly, the interrupt waiting unit 94 confirms that the interrupt waiting flag 90b has been cleared (Step S141), and causes the process 92 to wake up (Step S142). Then, the interrupt process thread 92b of the process 92, upon determining that the interrupt style 90c is not matched with the process 92 (Step S143), executes the interrupt acquiring request on the interrupt waiting unit 94 (Step S144). Consequently, the interrupt waiting unit 94 sets the interrupt waiting flag 90b (Step S145) to put the process 92 to sleep (Step S146).

However, there is a problem in which the electronic device according to the comparative example may not be able to execute any of the plurality of processes corresponding to the interrupt.

This will be described below in detail.

In the example illustrated in FIG. 9, since the process at Step S131, where the interrupt waiting unit 93 confirms that the interrupt waiting flag 90b has been cleared, and the process at Step S141, where the interrupt waiting unit 94 confirms that the interrupt waiting flag 90b has been cleared, are approximately simultaneously executed, any of the process 91 and the process 92 ensures the execution of an appropriate processing corresponding to the interrupt.

The operation timings of the process 91 and the process 92 are not necessarily simultaneous because the operation timings depend on the priority of the tasks and a scheduler for Linux OS.

Accordingly, as illustrated in FIG. 10, when the process at Step S141, where the interrupt waiting unit 94 confirms that the interrupt waiting flag 90b has been cleared is executed after the process at Step S135, where the interrupt waiting unit 93 sets the interrupt waiting flag 90b, the interrupt waiting unit 94 confirms that the interrupt waiting flag 90b has been set (Step S141). Thus, the interrupt waiting unit 94 does not cause the process 92 to wake up. That is, the process 92 does not ensure the execution of the processing corresponding to the interrupt in the example illustrated in FIG. 10.

Hereinafter, an embodiment of the disclosure will be described by referring to the drawings.

First, a description will be given of a configuration of a Multifunction Peripheral (MFP) as an electronic device according to the embodiment.

FIG. 1 is a block diagram of an MFP 10 according to the embodiment.

As illustrated in FIG. 1, the MFP 10 includes an operation unit 11, a display 12, a scanner 13, a printer 14, a fax communication unit 15, a communication unit 16, a storage unit 17, and a control unit 20. The operation unit 11 is an input device such as buttons for inputting various kinds of operations. The display 12 is a display device such as a Liquid Crystal Display (LCD) for displaying various kinds of information. The scanner 13 is a reading device for reading an image from an original document. The printer 14 is a print device for executing a print job on a recording medium such as a paper sheet. The fax communication unit 15 is a facsimile device for carrying out fax communication with a fax device (not illustrated) via a communication line such as a dial-up line. The communication unit 16 is a network communication device for communicating with external devices via a network such as a Local Area Network (LAN) or the Internet. The storage unit 17 is non-volatile storage devices such as a semiconductor memory and a Hard Disk Drive (HDD) for storing various kinds of information. The control unit 20 controls overall operation of the MFP 10.

The storage unit 17 stores an interrupt process program 17a, which controls an interrupt to each of a plurality of processes. The interrupt process program 17a may be installed in the MFP 10 at the production stage of the MFP 10, may be additionally installed in the MFP 10 from an external storage medium such as a SD card or a Universal Serial Bus (USB) memory, or may be additionally installed in the MFP 10 from the network.

The control unit 20 includes, for example, a Central Processing Unit (CPU) 21, a Read Only Memory (ROM) 22 storing a program and various kinds of data, and a Random Access Memory (RAM) 23 used as a work area of the CPU21. The CPU21 executes the program stored in the storage unit 17 or the ROM22.

Figure 2:
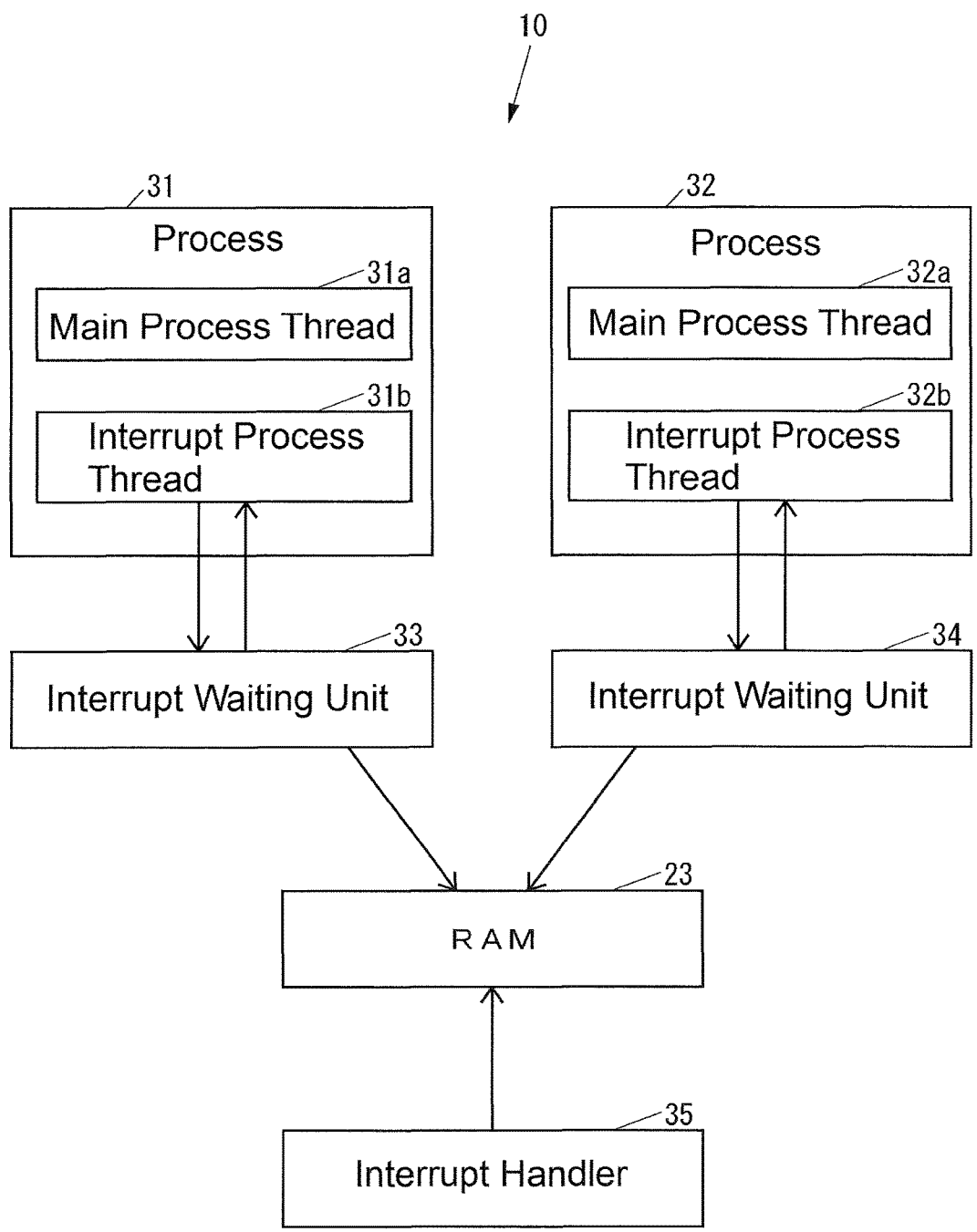
FIG. 2 illustrates the MFP according to the embodiment where both of two processes do not wait for occurrences of interrupts.

FIG. 2 is a block diagram illustrating a function of the MFP 10 where both of a process 31 and a process 32 are not waiting for occurrences of interrupts.

The MFP 10 illustrated in FIG. 2 uses Linux system calls as an event waiting mechanism.

The control unit 20 (see FIG. 1), by executing the interrupt process program 17a (see FIG. 1) stored in the storage unit 17 (see FIG. 1), can serve as the process 31, the process 32, an interrupt waiting unit 33, which waits for the interrupt to the process 31 as a Linux interrupt waiting function, an interrupt waiting unit 34, which waits for the interrupt to the process 32 as a Linux interrupt waiting function, and an interrupt handler 35 as a task for processing the interrupts. Thus, the interrupt waiting units 33 and 34 are provided for the respective processes.

The process 31 includes a main process thread 31a, which executes a main processing of the process 31, and an interrupt process thread 31b, which processes the interrupt.

The process 32 includes a main process thread 32a, which executes a main processing of the process 32, and an interrupt process thread 32b, which processes the interrupt.

Next, a description will be given of an operation of the MFP 10.

Figure 3:
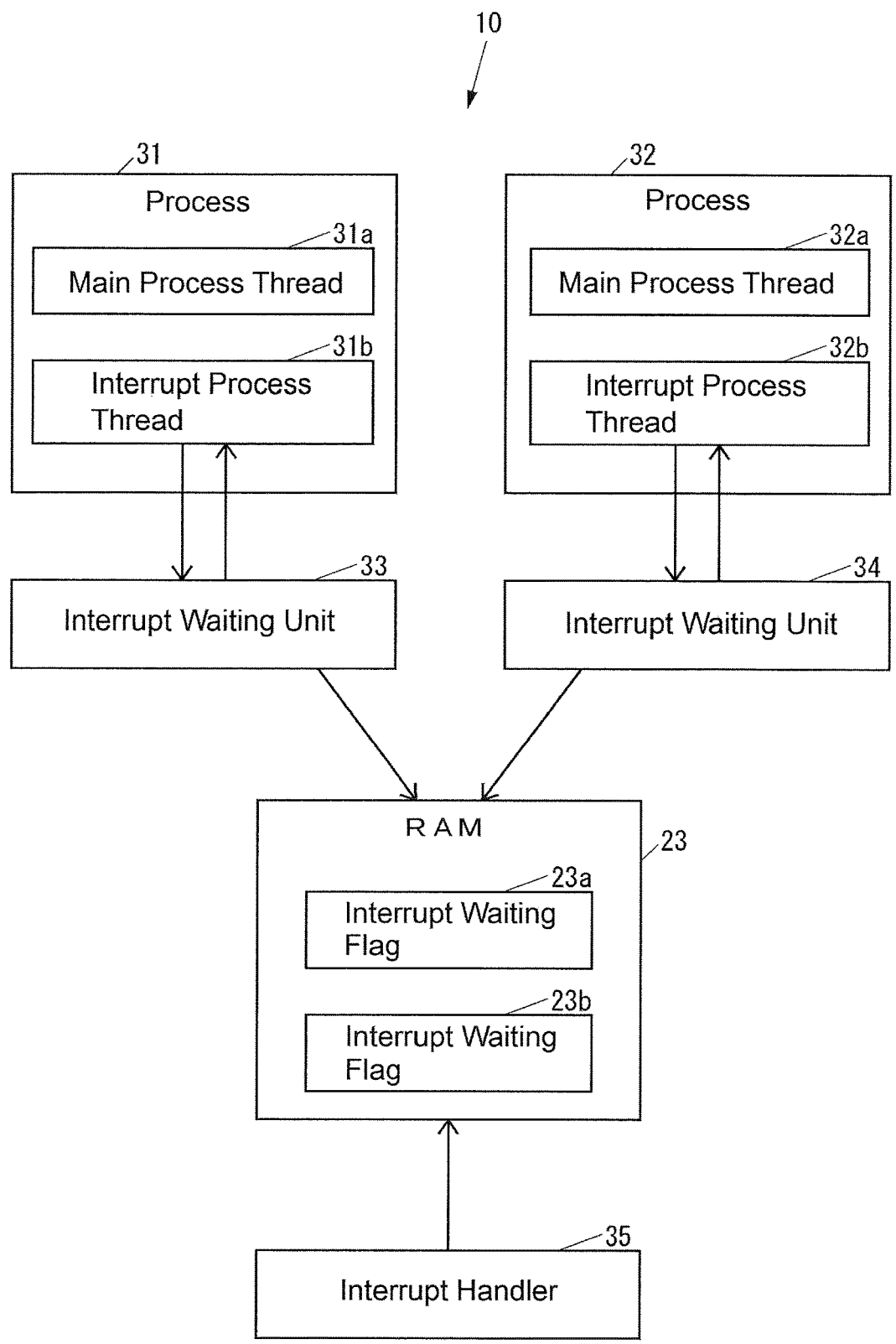
FIG. 3 illustrates the MFP according to the embodiment where both of the two processes wait for occurrences of interrupts.

FIG. 3 is a block diagram illustrating a function of the MFP 10 where both of the process 31 and the process 32 are waiting for the occurrences of the interrupts.

When the main process thread 31a waits for the occurrence of the interrupt, the interrupt process thread 31b of the process 31 executes an interrupt acquiring request on the interrupt waiting unit 33. Accordingly, as illustrated in FIG. 3, the interrupt waiting unit 33 sets an interrupt waiting flag 23a for the process 31 in a specified address on the RAM23 of the MFP 10 to wait for the occurrence of the interrupt, and retains the process 31 in a wait state by putting the process 31 to sleep.

Similarly, when the main process thread 32a waits for the occurrence of the interrupt, the interrupt process thread 32b of the process 32 executes an interrupt acquiring request on the interrupt waiting unit 34. Accordingly, as illustrated in FIG. 3, the interrupt waiting unit 34 sets an interrupt waiting flag 23b for the process 32 in a specified address on the RAM23 and retains the process 32 in the wait state by putting the process 32 to sleep.

Figure 4:
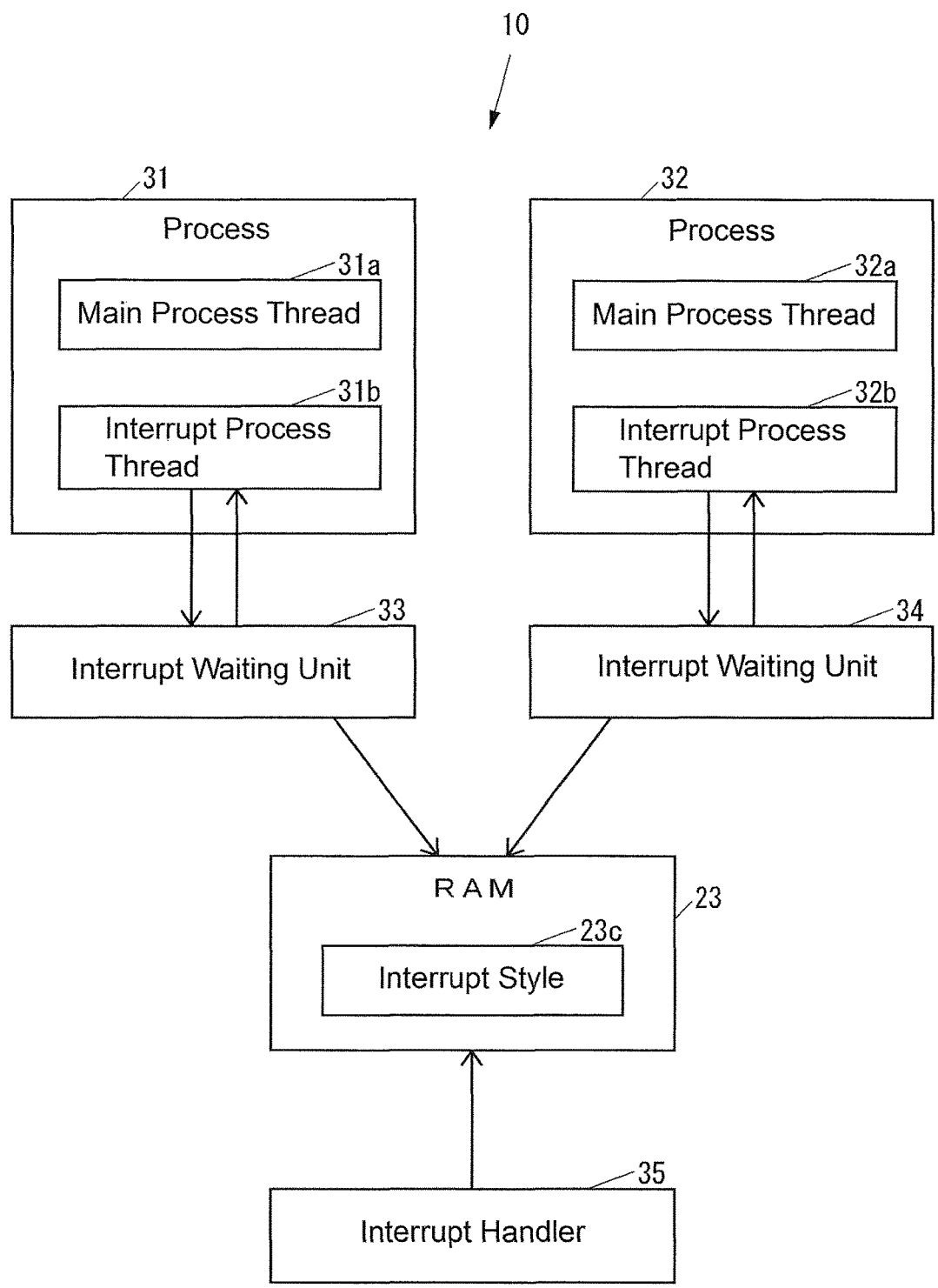
FIG. 4 illustrates the MFP according to the embodiment where an interrupt has occurred.

FIG. 4 is a block diagram illustrating a function of the MFP 10 where the interrupt has occurred.

When any interrupt such as a press of a power button, a press of a power saving key for power saving, or reception of an instruction from the network occurs, the interrupt handler 35 clears the interrupt waiting flag 23a and the interrupt waiting flag 23b on the RAM23. That is, the interrupt handler 35 releases the interrupt waiting flag 23a and the interrupt waiting flag 23b from the set state.

Then, the interrupt handler 35, as illustrated in FIG. 4, sets an interrupt style 23c for the occurred interrupt in a specific address on the RAM23.

Upon detecting a change in the interrupt waiting flag 23a from the set state as illustrated in FIG. 3 to a cleared state as illustrated in FIG. 4, the interrupt waiting unit 33 releases the process 31 from the wait state by causing the process 31 to wake up or get up.

Similarly, upon detecting a change in the interrupt waiting flag 23b from the set state as illustrated in FIG. 3 to the cleared state as illustrated in FIG. 4, the interrupt waiting unit 34 releases the process 32 from the wait state by causing the process 32 to wake up or get up.

Upon released from the wait state, the interrupt process thread 31b of the process 31 confirms the interrupt style 23c on the RAM23 to determine whether or not the interrupt style 23c is matched with the process 31. Then, if the interrupt process thread 31b determines that the interrupt style 23c is matched with the process 31, the main process thread 31a is operated. On the other hand, if the interrupt process thread 31b determines that the interrupt style 23c is not matched with the process 31, the interrupt acquiring request is executed on the interrupt waiting unit 33. Accordingly, the interrupt waiting unit 33, as illustrated in FIG. 3, sets the interrupt waiting flag 23a for the process 31 in the specific address on the RAM23 of the MFP 10 to wait for the occurrence of the interrupt, and retains the process 31 in the wait state by putting the process 31 to sleep.

Similarly, upon released from the wait state, the interrupt process thread 32b of the process 32 confirms the interrupt style 23c on the RAM23 to determine whether or not the interrupt style 23c is matched with the process 32. Then, if the interrupt process thread 32b determines that the interrupt style 23c is matched with the process 32, the main process thread 32a is operated. On the other hand, if the interrupt process thread 32b determines that the interrupt style 23c is not matched with the process 32, the interrupt acquiring request is executed on the interrupt waiting unit 34. Accordingly, the interrupt waiting unit 34, as illustrated in FIG. 3, sets the interrupt waiting flag 23*b* for the process 32 in the specific address on the RAM23 of the MFP 10 to wait for the occurrence of the interrupt, and retains the process 32 in the wait state by putting the process 32 to sleep.

Figure 5:
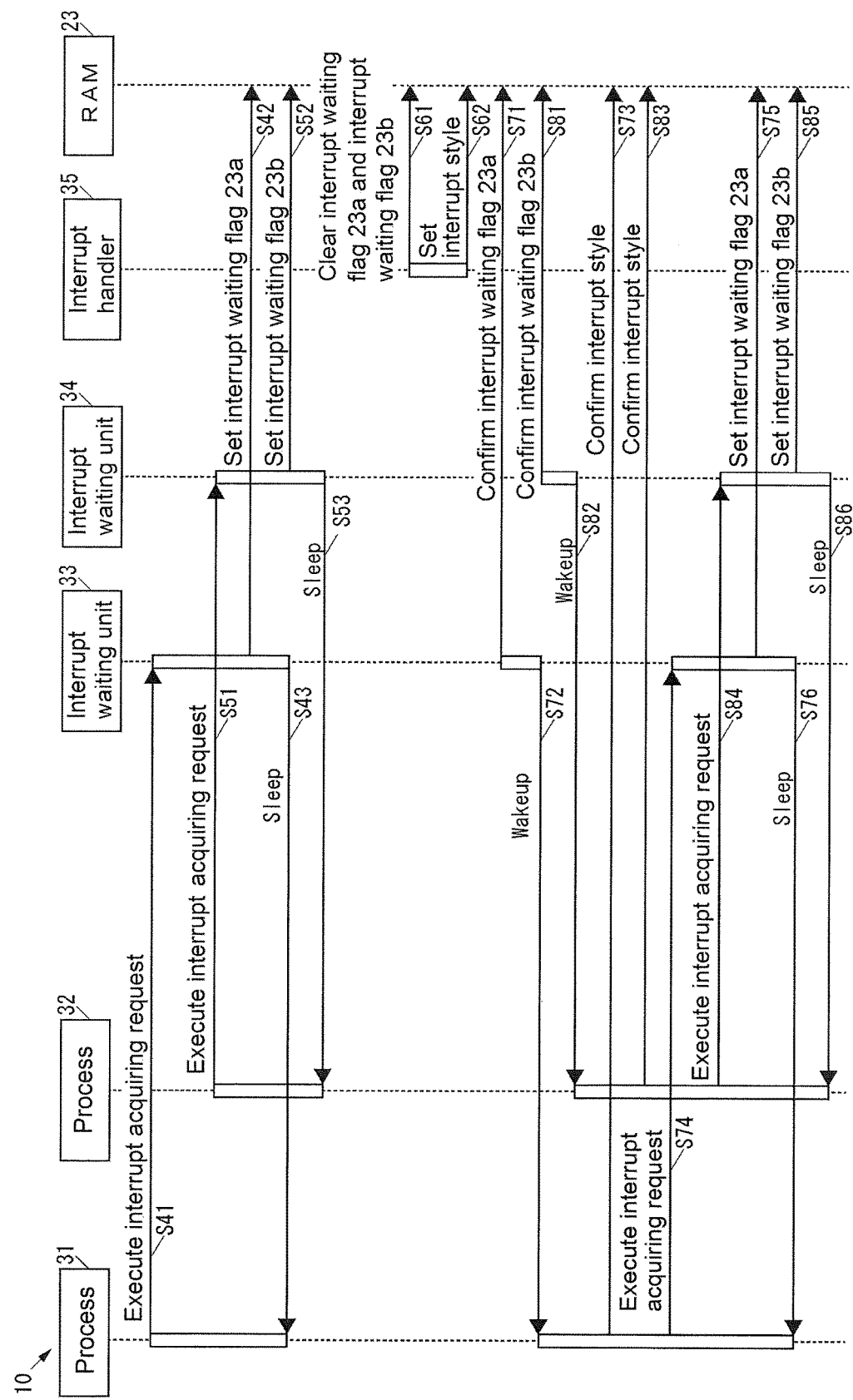
FIG. 5 illustrates an exemplary operation of the MFP according to the embodiment when executing an interrupt processing.

FIG. 5 is a sequence diagram illustrating an exemplary operation of the MFP 10 when executing the interrupt processing.

According to the operation illustrated in FIG. 5, the interrupt process thread 31*b* of the process 31 executes the interrupt acquiring request on the interrupt waiting unit 33 (Step S41), and the interrupt waiting unit 33 sets the interrupt waiting flag 23*a* (Step S42) to put the process 31 to sleep (Step S43). Similarly, the interrupt process thread 32*b* of the process 32 executes the interrupt acquiring request on the interrupt waiting unit 34 (Step S51), and the interrupt waiting unit 34 sets the interrupt waiting flag 23*b* (Step S52) to put the process 32 to sleep (Step S53).

Then, the interrupt handler 35, when any interrupt has occurred, clears the interrupt waiting flag 23*a* and the interrupt waiting flag 23*b* (Step S61), and sets the interrupt style 23*c* of the occurred interrupt (Step S62).

Accordingly, the interrupt waiting unit 33 confirms that the interrupt waiting flag 23*a* has been cleared (Step S71) and causes the process 31 to wake up (Step S72). Then, the interrupt process thread 31*b* of the process 31, upon determining that the interrupt style 23*c* is not matched with the process 31 (Step S73), executes the interrupt acquiring request on the interrupt waiting unit 33 (Step S74). Consequently, the interrupt waiting unit 33 sets the interrupt waiting flag 23*a* (Step S75) to put the process 31 to sleep (Step S76).

Similarly, the interrupt waiting unit 34 confirms that the interrupt waiting flag 23*b* has been cleared (Step S81) to cause the process 32 to wake up (Step S82). Then, the interrupt process thread 32*b* of the process 32, upon determining that the interrupt style 23*c* is not matched with the process 32 (Step S83), executes the interrupt acquiring request on the interrupt waiting unit 34 (Step S84). Consequently, the interrupt waiting unit 34 sets the interrupt waiting flag 23*b* (Step S85) to put the process 32 to sleep (Step S86).

As described above, the MFP 10 has the interrupt waiting flag 23*a* for the process 31 to wait for the occurrence of the interrupt, and the interrupt waiting flag 23*b* for the process 32 to wait for the occurrence of the interrupt. Thus, since the interrupt waiting flags 23*a* and 23*b* are provided for the respective processes, the process 31 and the process 32 each ensure execution of the appropriate processing corresponding to the interrupt.

The interrupt waiting unit may set the interrupt waiting flag when the main process thread has been completed. In this situation, when the main process thread 31*a* (or 32*a*) has been completed, the interrupt acquiring request is executed on the interrupt waiting unit 33 (or 34). The interrupt waiting unit 33 (or 34) sets the interrupt waiting flag 23*a* (or 23*b*) for the process 31 (or 32) in the specific address on the RAM23 of the MFP 10 to wait for the occurrence of the interrupt, and retains the process 31 in the wait state by putting the process 31 (or 32) to sleep.

Accordingly, even if the process 31 (or 32) is repeated, the process 31 and the process 31 (or 32) ensures execution of the appropriate processing corresponding to the interrupt.

While in the embodiment the electronic device of the disclosure is the MFP, the electronic device may be an image forming apparatus other than the MFP such as a copy-only machine, a printer-only machine, or a scanner-only machine, or may be an electronic device other than the image forming apparatus such as a Personal Computer (PC).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device comprising:
    a memory that stores an interrupt process program;
    a processor that executes the interrupt process program, wherein
    when the processor executes the interrupt process program, the processor controls
    a plurality of processes and operates as:
    a plurality of interrupt waiting units that correspond to the plurality of processes, respectively; and
    an interrupt handler that processes interrupts of the plurality of processes,
    wherein each of the plurality of interrupt waiting units sets an interrupt waiting flag to wait for an occurrence of an interrupt and waits for a process corresponding to each of the plurality of interrupt waiting units,
    the interrupt handler, when the interrupt occurred, sets an interrupt style of the occurred interrupt and clears all of interrupt waiting flags that have been set, then
    each of the plurality of interrupt waiting units confirm the interrupt style to determine whether or not the interrupt style is matched with the process corresponding to each of the plurality of interrupt waiting units,
    the plurality of interrupt waiting units include a first interrupt waiting unit that corresponds to a first process associated with the interrupt style that has been set and a second interrupt waiting unit that corresponds to a second process not associated with the interrupt style that has been set,
    the interrupt waiting flags include a first interrupt waiting flag corresponding to the first process and a second interrupt waiting flag corresponding to the second process,
    the first interrupt waiting unit operates the first process when the first interrupt waiting flag was cleared,
    the second interrupt waiting unit set the second interrupt waiting flag when the second interrupt waiting flag was cleared.

2. The electronic device according to claim 1, wherein each of the plurality of processes includes:
    a main process thread that executes a main process of each of the plurality of processes; and
    an interrupt process threat that processes the interrupt.

3. The electronic device according to claim 2, wherein the interrupt process thread of the first interrupt waiting unit operates the main process thread when the interrupt waiting flag corresponding to the first process was cleared.

4. The electronic device according to claim 2, wherein the interrupt process thread of the first interrupt waiting unit executes an interrupt acquiring request on the second interrupt waiting unit when the interrupt waiting flag corresponding to the second process was cleared, and
    the second interrupt waiting unit sets, based on the interrupt acquiring request, the interrupt waiting flag corresponding to the second process.

5. A non-transitory computer-readable recording medium storing an interrupt process program to control an electronic device, the interrupt process program causing a computer of the electronic device to operate as:
- a plurality of processes;
- a plurality of interrupt waiting units that correspond to the plurality of processes, respectively; and
- an interrupt handler that processes interrupts of the plurality of processes,
- wherein each of the plurality of interrupt waiting units sets an interrupt waiting flag to wait for an occurrence of an interrupt and waits for a process corresponding to each of the plurality of interrupt waiting units,
- the interrupt handler, when the interrupt occurred, sets an interrupt style of the occurred interrupt and clears all of interrupt waiting flags that have been set, then
- each of the plurality of interrupt waiting units confirm the interrupt style to determine whether or not the interrupt style is matched with the process corresponding to each of the plurality of interrupt waiting units,
- the plurality of interrupt waiting units include a first interrupt waiting unit that corresponds to a first process associated with the set interrupt style that has been set and a second interrupt waiting unit that corresponds to a second process not associated with the set interrupt style that has been set,
- the interrupt waiting flags include a first interrupt waiting flag corresponding to the first process and a second interrupt waiting flag corresponding to the second process,
- the first interrupt waiting unit operates the first process when the first interrupt waiting flag was cleared,
- the second interrupt waiting unit set the interrupt waiting flag when the second interrupt waiting flag was cleared, and
- the interrupt waiting flag is located to each of the plurality of processes.

* * * * *